United States Patent
Kim

(10) Patent No.: US 9,264,482 B2
(45) Date of Patent: Feb. 16, 2016

(54) BATCHING-BASED CONTENT ROUTING METHOD AND APPARATUS FOR PERFORMING BATCHING-BASED CONTENT ROUTING METHOD

(71) Applicant: ELECTRONICS & TELECOMMUNICATIONS RESEARCH INSTITUTE, Daejeon (KR)

(72) Inventor: Jeong Yun Kim, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 14/184,070

(22) Filed: Feb. 19, 2014

(65) Prior Publication Data

US 2015/0067051 A1    Mar. 5, 2015

(30) Foreign Application Priority Data

Aug. 28, 2013  (KR) .................. 10-2013-0102642

(51) Int. Cl.
*G06F 15/16* (2006.01)
*H04L 29/08* (2006.01)

(52) U.S. Cl.
CPC ............ *H04L 67/06* (2013.01); *H04L 67/2833* (2013.01)

(58) Field of Classification Search
CPC .................... H04L 67/06; H04L 67/2833
See application file for complete search history.

(56) References Cited

U.S. PATENT DOCUMENTS

| | | | | |
|---|---|---|---|---|
| 7,779,416 B2* | 8/2010 | Koga | ............ | G06F 9/505 718/105 |
| 8,909,795 B2* | 12/2014 | Ha | ............ | H04L 61/6068 709/228 |
| 2004/0194087 A1* | 9/2004 | Brock | ............ | G06F 9/505 718/100 |
| 2007/0245029 A1* | 10/2007 | Ha | ............ | H04L 61/6068 709/228 |
| 2008/0307035 A1* | 12/2008 | Burckart | ............ | G06F 17/30867 709/203 |
| 2010/0299453 A1* | 11/2010 | Fox | ............ | G06Q 30/0613 709/246 |

(Continued)

FOREIGN PATENT DOCUMENTS

KR    1020120041317 A    5/2012

OTHER PUBLICATIONS

Jeong Yun Kim, et al; "Efficient Multicast Schemes Using In-Network Caching for Optimal Content Delivery", IEEE Communications Leters, vol. 17, No. 5, May 2013; 7 pages.

(Continued)

*Primary Examiner* — Moustafa M Meky
(74) *Attorney, Agent, or Firm* — Ladas & Parry LLP

(57) ABSTRACT

The method includes, receiving a content request message from a user terminal, comparing a batching window value and a timer value in session information when there is session information corresponding to received content, and transmitting a content response message including an address of a stored surrogate server to the user terminal when the timer value is less than the batching window value. In addition, the method includes, receiving a request message for requesting the same content from another user terminal, and transmitting the content response message including address information of the same surrogate server to another user terminal when the timer value is less than the batching window value. Therefore, since more channels can be assigned to one surrogate server, it is possible to decrease data transmission costs of the surrogate server.

16 Claims, 4 Drawing Sheets

(56) References Cited

U.S. PATENT DOCUMENTS

2011/0161355 A1 6/2011 Lee et al.
2012/0124208 A1 5/2012 Park et al.
2015/0156169 A1* 6/2015 Ha .................... H04L 61/6068
709/228

OTHER PUBLICATIONS

Jeong Yun Kim, et al; "Hybrid Multicast Scheme using In-Network Caching for Minimizing Content Delivery Cost", 2013 IEEK Summer Conference, Jul. 3, 2013; pp. 522-525.

* cited by examiner

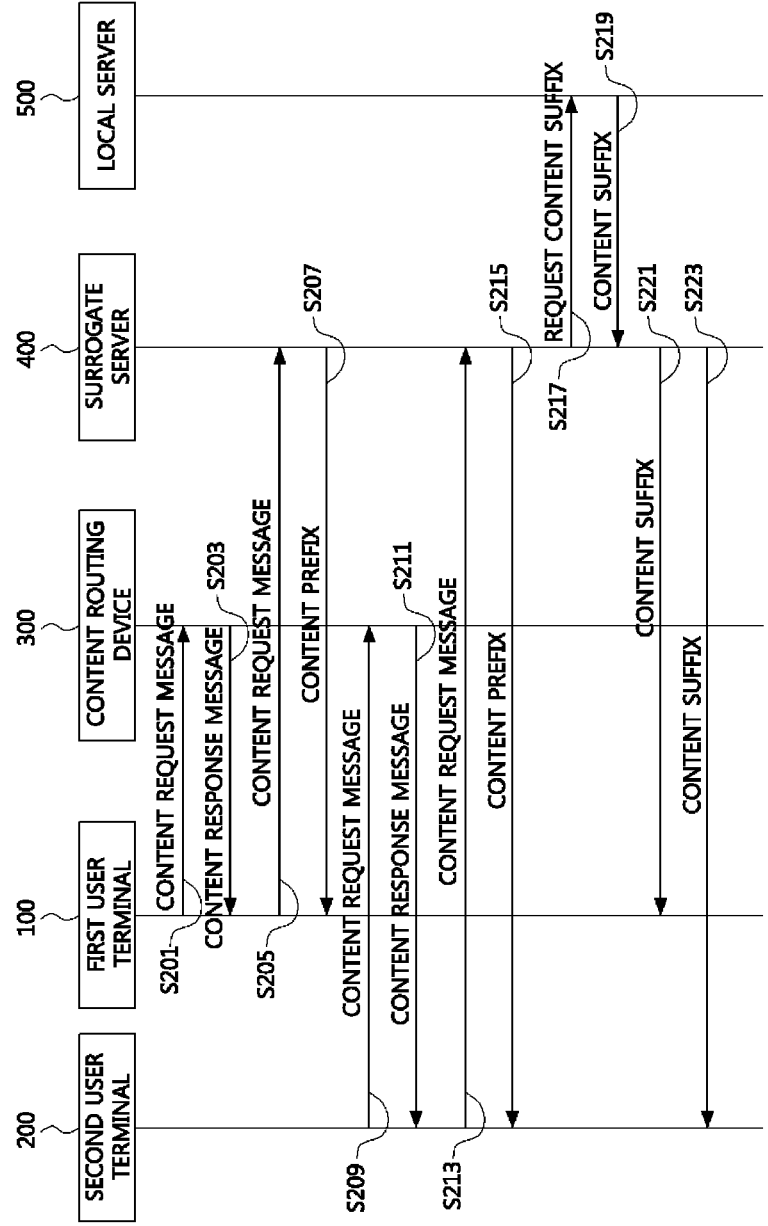

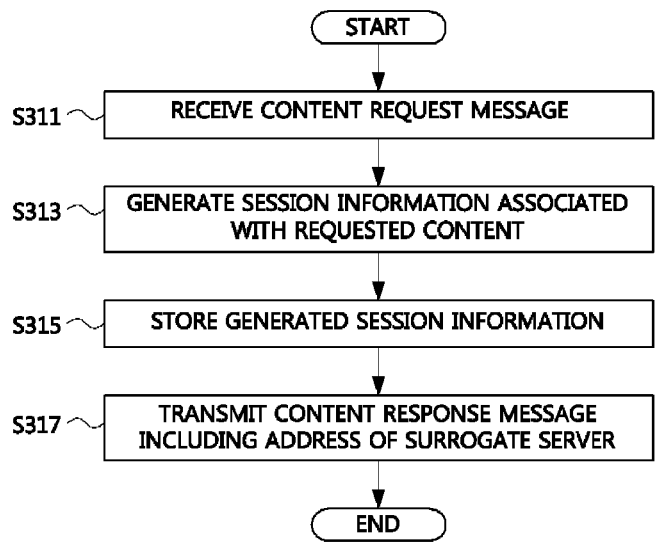
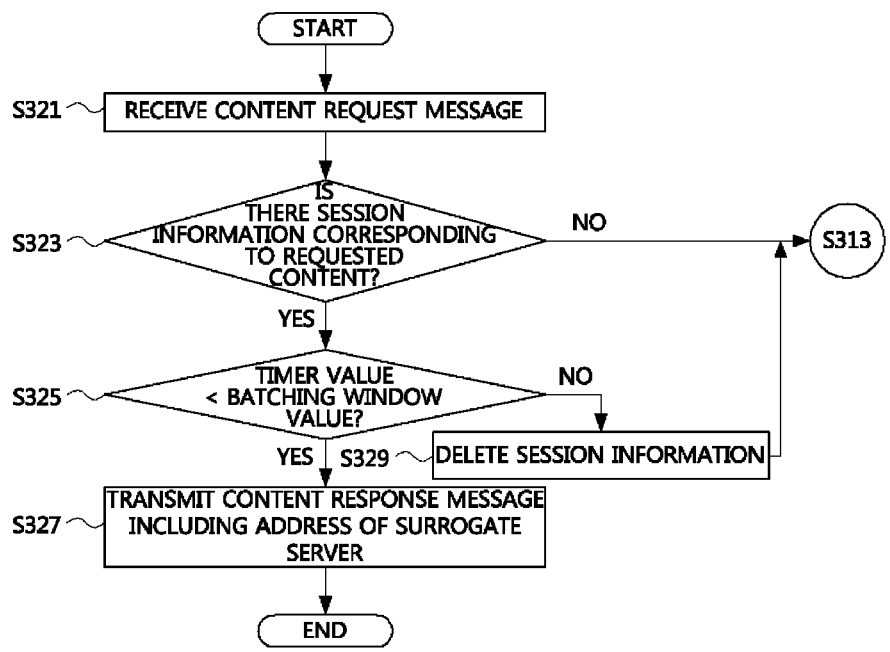

BATCHING-BASED CONTENT ROUTING METHOD AND APPARATUS FOR PERFORMING BATCHING-BASED CONTENT ROUTING METHOD

CLAIM FOR PRIORITY

This application claims priority to Korean Patent Application No. 2013-0102642 filed on Aug. 28, 2013 in the Korean Intellectual Property Office (KIPO), the entire contents of which are hereby incorporated by reference.

BACKGROUND

1. Technical Field

The following description relates to content delivery technology, and more particularly, to a batching-based content routing method that can decrease content delivery costs and an apparatus for performing the batching-based content routing method.

2. Related Art

Recently, use of smart terminals has been increasing and demand for content provided through such smart terminals has been increasing. In providing such content, a content transmission rate is an important issue.

However, when a user device requests a content to a server that locates far from the user device, a content delivery time increases due to distance. Moreover, content delivery quality may be deteriorated according to, for example, server states (for example, overload) and network states (for example, traffic congestion).

Therefore, a content delivery network (CDN) is used to reduce a content delivery delay and a load of an origin server.

The CDN could be broadly divided into two types according to application scopes. A global CDN is appropriately among a number of internet service providers (ISPs), whereas a local CDN is appropriate for applying within a single ISP network.

The global CDN includes a origin server and surrogate servers. The local CDN includes a local server and surrogate servers. The origin server could correspond to the local server from their responsibility perspective and vice versa. The surrogate server may be located close to a user and hence immediately deliver content to the user. Despite such advantages, due to a limited disk capacity of the surrogate server, it is difficult to completely cache content (especially, videos) of the origin server.

In order to address such problems, the origin server (or the local server) stores all content whereas the surrogate server stores some part of the content (especially, a front part of the content, referred to as a prefix). The surrogate server delivers prefixes to clients who request the content via multicast, receives a suffix (a remaining content part other than the prefix) from the origin server (or the local server) via unicast, and then delivers the received suffix to the clients via multicast.

Here, the unicast is applied between two servers. That is, during a batching window period, the surrogate server batch-processes requests from a plurality of clients who want the same content, and requests suffix delivery from the origin server (or the local server) one time. In this way, since the surrogate server batch-processes content requests and delivers the suffix via multicast, it is possible to reduce delivery costs.

However, in this method, since client requests are batch-processed in units of single surrogate servers, reduction of content delivery costs would be a little bit limited. Especially, as the number of surrogate servers in the CDN increases, reduction of content delivery costs will not be changed significantly.

SUMMARY

Accordingly, example embodiments of the present invention are provided to substantially obviate one or more problems due to limitations and disadvantages of the related art.

Example embodiments of the present invention provide a batching-based content routing method that can reduce content delivery costs.

Example embodiments of the present invention also provide an apparatus for performing the batching-based content routing method.

A batching-based content routing method includes receiving a content request message from a user terminal, generating session information associated with the content when there is no session information corresponding to the content, storing the generated session information, and transmitting a content response message including an address of a surrogate server that can receive the content in the generated session information to the user terminal.

The session information may include at least one of a batching window value that is a time for batch processing content request, content name, the address of the surrogate server that delivers requested content, and a timer value that is used for comparison with the batching window value.

In the transmitting of the content response message to the user terminal in response to the content request message, the content response message including the address of the surrogate server may be transmitted to the user terminal.

In other example embodiments, a batching-based content routing method includes, receiving a content request message from a user terminal, comparing a batching window value and a timer value of an entry included in the session information when there is session information corresponding to the content, and transmitting a content response message including an address of a surrogate server to the user terminal based on a comparison result between the timer value and batching window value.

In the transmitting of the content response message to the user terminal, the content response message including the address of the stored surrogate server may be transmitted to the user terminal when the timer value is less than the batching window value.

The address of the surrogate server may be an address of the surrogate server that is the most appropriate for the user terminal based on at least one of network proximity, server states, network states, and operator policies, when selecting surrogate servers storing the content.

The content routing method may further include receiving a request message for the same content from other user terminals, and transmitting the content response message including the address of the surrogate server to other user terminals if the timer value is less than the batching window value.

The transmitting of the content response message to the user terminal may include deleting the session information when the timer value is equal to or more than the batching window value, generating session information based on the content included in the received content request message, storing the generated session information, and generating the content response message in response to the content request message and transmitting the message to the user terminal.

In the storing of the generated session information, the batching window value and the address of the surrogate server may be stored and the timer value may be initialized and stored.

In the generating of the content response message in response to the content request message and transmitting of the message to the user terminal, the content response message including the address of the surrogate server may be transmitted to the user terminal.

In still other example embodiments, a batching-based content routing device includes a communication unit configured to communicate with a user terminal, a storage unit, and a processing unit configured to, when content session information corresponding to a content request message received from a first user terminal through the communication unit is stored in the storage unit, compare a batching window value and a timer value included in the session information, generate a content response message including an address of a surrogate server that can receive content based on a comparison result and transmit the message to the first user terminal.

When the timer value included in the session information is less than the batching window value, the processing unit may generate the content response message including the address of the surrogate server and transmit the generated content response message to the first user terminal through the communication unit.

When the timer value included in the session information is equal to or more than the batching window value, the processing unit may delete the session information stored in the storage unit, generate session information associated with the content requested from the first user terminal, store the generated session information in the storage unit, and then generate the content response message including the address of the surrogate server and transmit the message to the first user terminal.

The session information may include at least one of a batching window value that is a time for batch processing content request, content name, the address of the surrogate server that delivers requested content, and a timer value that is used for comparison with the batching window value.

When the content request message for requesting the same content as the first user terminal is received from a second user terminal through the communication unit and the timer value in the session information is less than the batching window value, the processing unit may generate the content response message including the address of the surrogate server that has been transmitted to the first user terminal, and transmit the generated content response message to the second user terminal.

The address of the surrogate server may be an address of the surrogate server that is most appropriate for the first user terminal based on at least one of network proximity, server states, network states, and operator policies, when selecting surrogate servers storing the content.

BRIEF DESCRIPTION OF DRAWINGS

Example embodiments of the present invention will become more apparent by describing in detail example embodiments of the present invention with reference to the accompanying drawings, in which:

FIG. 2 is a sequence diagram illustrating batching-based content routing operations according to the embodiment of the invention.

FIG. 3 is a flowchart illustrating operations of storing a new session among the batching-based content routing operations according to the embodiment of the invention.

FIG. 4 is a flowchart illustrating batching-based content routing operations when the stored session exists according to the embodiment of the invention.

DESCRIPTION OF EXAMPLE EMBODIMENTS

Figure 1:
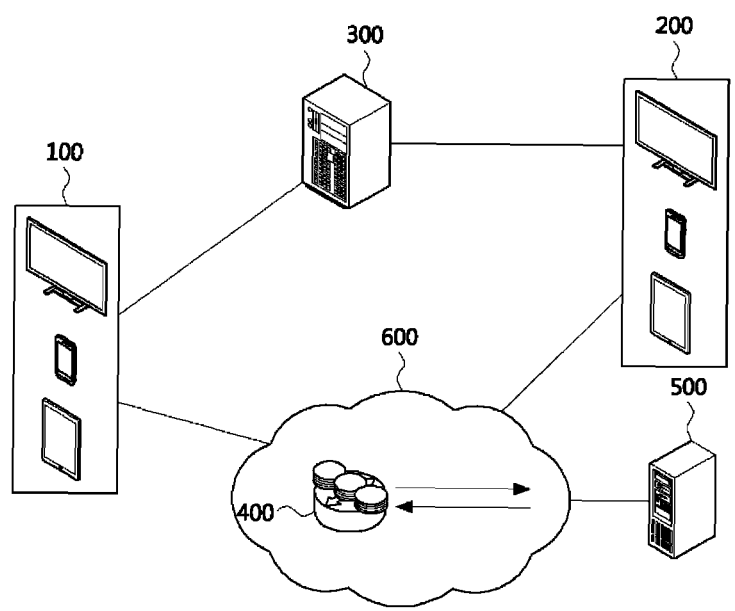
FIG. 1 is a conceptual diagram illustrating an environment in which a batching-based content routing method is performed according to an embodiment of the invention.

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific tennis) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, exemplary embodiments of the invention will be described in detail with reference to the accompanying drawings. Parts of the exemplary embodiments are consistently denoted by the same reference numerals throughout the drawings and detailed description.

The term "user terminal" used throughout this specification may include, for example, a desktop computer, laptop computer, tablet PC, wireless phone, mobile phone, smart phone, e-book reader, portable multimedia player (PMP), portable game console, navigation device, to digital camera, digital multimedia broadcasting (DMB) player, digital audio recorder, digital audio player, digital picture recorder, digital picture player, digital video recorder, and digital video player which are capable of communication.

Throughout this specification, a content routing method may be applied to a global CDN and local CDN in the same way. Since a local server is functionally equivalent to an origin server, the local server and origin server may be considered the same unless specified otherwise.

FIG. 1 is a conceptual diagram illustrating an environment in which a batching-based content routing method is performed according to an embodiment of the invention.

As illustrated in FIG. 1, the environment in which a batching-based content routing method is performed according to the embodiment of the invention includes user terminals 100 and 200 that request content, a content routing device 300 configured to provide an address of a surrogate server 400 that stores requested content and transmits the content to the user terminals 100 and 200, the surrogate server 400 that is distributed over a network and transmits prefix content to the user terminals 100 and 200, and a local server 500 configured to store all content in an ISP network 600. Here, a content storing method of the local server includes storing content in advance and caching content in real time.

Hereinafter, the embodiment of the invention assumes that the local server 500 previously stores content requested from the user terminals 100 and 200.

The user terminal 100 generates a content request message including a content router address and content name based on a user's input, and transmits the generated content request message to the content routing device 300.

When the content request message is received from the user terminal 100 and it is determined that there is no content session information corresponding to requested content, the content routing device 300 generates session information associated with the requested content and stores the generated session information.

Here, the content routing device 300 may determine whether there is content session information corresponding to the requested content using a name of the requested content as a session identifier. Moreover, the session information may include, for example, a content title, batching window value, surrogate server address, and timer value.

Further, when the content request message is received from the user ten final 100, the content routing device 300 determines whether there is content session information corresponding to the requested content. When it is determined that the there is content session information corresponding to the requested content, the content routing device 300 compares the timer value and batching window value in the session information associated with the content. When the timer value is less than the batching window value, the content routing device 300 generates a content response message including surrogate server address information in the session information associated with the content, and transmits the generated content response message to the user terminal 100.

Moreover, when the timer value is equal to or more than the batching window value, the content routing device 300 deletes pre-stored session information, generates new session information, and stores the information.

The surrogate server 400 receives the content request message from the user terminal 100, and transmits a prefix part of the requested content to the user terminal 100 via unicast.

Further, the surrogate server 400 operates a timer at which an initial content request message is received, batch-processes request messages for the same content received until the timer value reaches the batching window value, and then transmits one suffix request message to the local server 500.

The local server 500 transmits a suffix part corresponding to the suffix request message received from the surrogate server 400 to the surrogate server 400.

Hereinafter, overall operations of the batching-based content routing method will be described with reference to FIG. 2.

FIG. 2 is a sequence diagram illustrating batching-based content routing operations according to the embodiment of the invention.

As illustrated in FIG. 2, the first user terminal 100 transmits the content request message to the content routing device 300 based on a user's input (S201).

When the content request message is received from the first user terminal 100 in operation 201 and it is determined that there is content session information corresponding to the received content, the content routing device 300 transmits the content response message to the first user terminal 100 (S203).

Here, the content response message may include an address of the surrogate server 400 from which the first user terminal 100 can receive the content.

When the content response message is received from the content routing device 300 in operation 203, the first user terminal 100 transmits the content request message to the surrogate server 400 based on the address of the surrogate server 400 included in the received content response message (S205).

Here, the address 322 of the surrogate server 400 refers to an address of the surrogate server 400 that is the most appropriate for the first user terminal 100 among a plurality of surrogate servers storing the requested content.

Here, the address of one among the surrogate servers storing the content that is the most appropriate for the first user terminal 100 may be determined in consideration of, for example, network proximity, server states, network states, and operator policies.

Meanwhile, surrogate servers having similar proximity among the plurality of surrogate servers may be configured as one group. A priority is assigned to each of the surrogate servers in the configured group. The priority may be differently assigned for a client or a group.

When the content request message is received in operation 205, the surrogate server 400 operates the timer, transmits a content prefix to the first user terminal 100 via unicast, and then waits reception of an additional content request message until the timer value reaches the batching window value (S207).

The second user terminal 200 transmits the content request message that requests the same content to the content routing device 300 based on the user's input (S209).

When the content request message is received from the second user terminal 200 in operation 209, the content routing device 300 determines whether a value of the timer, which began operating when the content request message was received from the first user terminal 100, is equal to or more than the batching window value. When the value of the timer is less than the batching window value, the content response message including the address of the same surrogate server 400 is transmitted to the second user terminal 200 (S211).

When the content response message including the address of the surrogate server 400 is received in operation 211, the second user terminal 200 transmits the content request message to the surrogate server 400 based on the received content response message (S213).

When the content request message is received from the second user terminal 200 in operation 213, the surrogate server 400 transmits the content prefix to the second user terminal 200 (S215).

Here, the surrogate server 400 determines whether the timer value is less than the batching window value. When it is determined that the timer value is less than the batching window value, batch processing is performed on the content request message received from the first user terminal 100 and the content request message received from the second user terminal 200.

On the other hand, when it is determined that the timer value is equal to or more than the batching window value, the surrogate server 400 transmits a content suffix request message to the local server 500 based on the batch-processed content request message (S217).

When the content suffix request message is received from the surrogate server 400 in operation 217, the local server 500 obtains the received content suffix and transmits the obtained content suffix to the surrogate server 400 (S219).

When the content suffix is received in operation 219, the surrogate server 400 respectively transmits the received content suffix to the first and second user terminals 100 and 200 (S221 and S223).

According to the embodiment of the invention, since a batch processing method in units of content delivery networks (CDNs) is used and more channels can be assigned to the single surrogate server 400, data transmission costs of the surrogate server 400 can be reduced.

FIG. 3 is a flowchart illustrating operations of storing a new session among the batching-based content routing operations according to the embodiment of the invention.

As illustrated in FIG. 3, the content routing device 300 receives the content request message from the first user terminal 100 (S311).

When the content request message is received in operation 311, the content routing device 300 determines whether there is content session information corresponding to the requested content. When it is determined that there is no content session information, the content routing device 300 generates session information associated with the requested content (S313).

Here, the session information may include, for example, the batching window value, surrogate server address, and timer value. The address of the surrogate server refers to an address of the surrogate server 400 that is the most appropriate for the first user terminal 100 among the plurality of surrogate servers storing the requested content.

Then, the content routing device 300 stores the session information generated in operation 313 (S315).

Here, the timer value is set to have an initial value of 0 when the session information is generated, and then the timer starts.

The content routing device 300 generates the content response message including the address of the surrogate server and transmits the generated content response message to the first user terminal 100 (S317).

FIG. 4 is a flowchart illustrating batching-based content routing operations when the stored session exists according to the embodiment of the invention.

As illustrated in FIG. 4, the content routing device 300 receives the content request message from the first user terminal 100 (S321).

When the content request message is received in operation 321, the content routing device 300 determines whether there is session information corresponding to the requested content (S323).

Here, the content routing device 300 may determine whether there is corresponding session information by a method of determining whether there is a corresponding identifier using a name of the requested content as an identifier. Moreover, the session information may include, for example, the batching window value, surrogate server address, and timer value. Especially, the batching window value is a maximum time for batching content requests and may be determined using mathematical models or simulation for each piece of content.

Then, when it is determined that the there is session information corresponding to the requested content, the content routing device 300 determines whether the timer value included in the session information is less than the batching window value (S325).

On the other hand, when it is determined that there is no session information corresponding to the requested content, the content routing device 300 sequentially performs operations from the operation of generating session information associated with the requested content in operation 313 of FIG. 3.

When it is determined that the timer value is less than the batching window value in operation 325, the content routing device 300 transmits the content response message including the address of the surrogate server to the first user terminal 100 (S327).

Here, when the same content request message is received from another terminal, for example, the second user terminal 200, and the timer value is less than the batching window value, the content routing device 300 transmits the content response message including the address of the surrogate server 400, which is the same message transmitted to the first user terminal 100, to the second user terminal 200.

Accordingly, since the content request messages of the first and second user terminals 100 and 200 received in one surrogate server 400 can be batch-processed, it is possible to reduce data transmission costs of the surrogate server 400.

On the other hand, when it is determined that the timer value is equal to or more than the batching window value in operation 325, the content routing device 300 deletes the stored session information (S329), and sequentially performs operations from the operation of generating session information associated with the requested content in operation 313 of FIG. 3.

Figure 5:
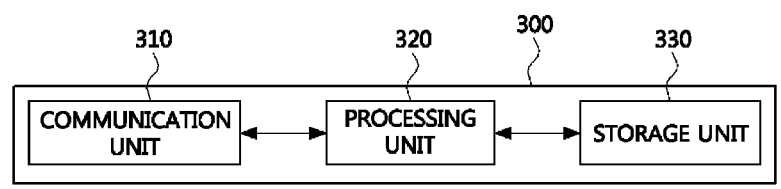
FIG. 5 is a block diagram illustrating a configuration of a content routing device for performing the batching-based content routing method according to the embodiment of the invention.

FIG. 5 is a block diagram illustrating a configuration of a content routing device for performing the batching-based content routing method according to the embodiment of the invention.

As illustrated in FIG. 5, the content routing device 300 according to the embodiment of the invention may include a communication unit 310, a processing unit 320, and a storage unit 330.

First, the communication unit 310 communicates with the user terminals 100 and 200, and transmits the content response message to the user terminals 100 and 200 under control of the processing unit 320.

Here, communications between the user terminals 100 and 200 in the communication unit 310 may be performed using various wireless communication technology, for example, IEEE 802.11x (for example, 802.11a, 802.11b, 802.11g, 802.11n, and 802.11ac), Bluetooth, Zigbee, ultra wide band (UWB), near field communication (NFC), binary division multiple access (B-CDMA), long term evolution (LTE), and wireless broadband (WiBro).

When the content request message is received from the first user terminal 100, the processing unit 320 determines whether content session information corresponding to the requested content is stored in the storage unit 330. When it is determined that there is no corresponding content session information in the storage unit 330, the processing unit 320 generates session information associated with the requested content.

Here, the session information may include, for example, the batching window value, surrogate server address, and timer value. The surrogate server address refers to an address of the surrogate server that is the most appropriate for the first user terminal 100 among the plurality of surrogate servers storing the requested content. Moreover, the processing unit 320 stores the generated session information in the storage unit 330.

Here, the timer value in the session information is set to have an initial value of 0 when the session information is generated, and then the timer starts.

When the content request message is received through the communication unit 310 and it is determined that the session information corresponding to the requested content is stored in the storage unit 330, the processing unit 320 compares the batching window value and the timer value included in the session information.

Here, the batching window value is a maximum time for batching content requests and may be determined using mathematical models or simulation for each piece of content.

When it is determined that the timer value included in the session information is less than the batching window value, the processing unit 320 generates the content response message including the address of the surrogate server, and transmits the generated content response message to the first user terminal 100 through the communication unit 310.

On the other hand, when it is determined that the timer value included in the session information is equal to or more than the batching window value, the processing unit 320 deletes the session information stored in the storage unit 330, generates session information associated with the requested content, and stores the information again in the storage unit 330. Then, the processing unit 320 generates the content response message including the address of the surrogate server, and transmits the generated content response message to the first user terminal 100 through the communication unit 310.

The storage unit 330 may include a non-volatile storage having a large capacity (for example, a hard disk drive) and store session information, for example, a content name, batching window value, surrogate server address, and timer value.

Here, the address of the surrogate server and batching window value in the session information may be determined in advance. Moreover, the timer value is set to 0 and operates. When the timer value is equal to or more than the batching window value, corresponding session information is not used.

In the batching-based content routing device according to the embodiment of the invention, since the address of one surrogate server 400 is provided to the first and second user terminals 100 and 200 and the number of channels assigned to one surrogate server 400 increases, data transmission costs of the surrogate server 400 can be reduced.

Figure 6:
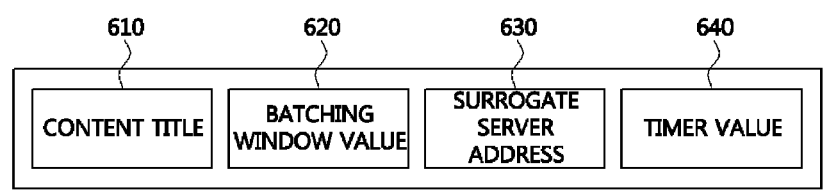
FIG. 6 is a diagram illustrating a structure of session information according to the embodiment of the invention.

FIG. 6 is a diagram illustrating a structure of the session information according to the embodiment of the invention.

As illustrated in FIG. 6, the session information according to the embodiment of the invention may include a content name 610, a batching window value 620, a surrogate server address 630, and a timer value 640.

First, the content name 610 is used as a session identifier and used to retrieve the session information.

The batching window value 620 is a maximum time for batching content requests and is used for comparison with the timer value 640.

Here, the batching window value 620 may be set to an optimal value using mathematical models or simulation for each piece of content.

The surrogate server address 630 refers to an address of the surrogate server 400 that is the most appropriate for the user terminals 100 and 200 among the plurality of surrogate servers storing the requested content.

Here, the plurality of surrogate servers having similar proximity may be configured as one group. A priority is assigned to each of the surrogate servers in the one configured group. Meanwhile, the priority may be differently assigned for a user or a group.

Moreover, when a specific surrogate server 400 is selected as a content delivery server, the content routing device 300 in FIG. 5 transmits the address of the surrogate server 400 selected by an initial content request as a response with respect to the content request received within a batching window value time, and continuously designates the surrogate server 400 as the content delivery server.

The timer value 640 is set to have an initial value of 0 when the session information is generated and the timer starts. Otherwise, the timer may start when the content request message is received.

Here, the timer value 640 is used for comparison with the batching window value 620. When the timer value 640 is equal to or more than the batching window value 620, corresponding session information is meaningless.

In the batching-based content routing method and device therefore according to the embodiment of the invention, since the content routing device delivers the same content request message received up to reaching the batching window value to a single surrogate server, it is possible to increase batch processing efficiency of the surrogate server.

Since the batch processing of the surrogate server increases a multicast effect between the surrogate server and the local server (or the origin server), it is possible to decrease the number of channels required for delivery of one piece of content. Therefore, since a length of the content (prefix) delivered between the user terminal and the surrogate server decreases, and accordingly, the number of required channels decreases, it is possible to decrease content delivery costs. In this case, the number of channels required for each piece of content between the surrogate server and the local server (or the origin server) is inversely proportional to the length of the content (prefix) delivered between the user terminal and the surrogate server.

While example embodiments of the present invention and their advantages have been described in detail, it should be understood that various changes, substitutions and alterations may be made herein without departing from the scope of the invention as defined by the following claims.

| Reference Numerals | |
|---|---|
| 100: first user terminal | 200: second user terminal |
| 300: content routing device | 310: communication unit |
| 320: processing unit | 330: storage unit |

| Reference Numerals | |
|---|---|
| 400: surrogate server | 500: local server |
| 600: ISP network | |

What is claimed is:

1. A batching-based content routing method comprising:
receiving a content request message from a user terminal;
generating session information associated with the content when there is no session information corresponding to the content;
storing the generated session information; and
transmitting a content response message including an address of a surrogate server that stores the content in the generated session information to the user terminal.

2. The method of claim 1, wherein the session information includes at least one of a batching window value that is a time for batch processing content request, content name, the address of the surrogate server that delivers requested content, and a timer value that is used for comparison with the batching window value.

3. The method of claim 2, wherein in the transmitting of the content response message to the user terminal in response to the content request message, the content response message including the address of the surrogate server is transmitted to the user terminal.

4. A batching-based content routing method comprising:
receiving a content request message from a user terminal;
comparing a batching window value and a timer value of an entry included in the session information when there is session information corresponding to the content; and
transmitting a content response message including an address of a surrogate server to the user terminal based on a comparison result between the timer value and batching window value.

5. The method of claim 4, wherein in the transmitting of the content response message to the user terminal, the content response message including the address of the stored surrogate server is transmitted to the user terminal when the timer value is less than the batching window value.

6. The method of claim 4, wherein the address of the surrogate server is an address of the surrogate server that is the most appropriate for the user terminal based on at least one of network proximity, server states, network states, and operator policies, when selecting surrogate servers storing the content.

7. The method of claim 4, further comprising:
receiving a request message for the same content from other user terminals; and
transmitting the content response message including the address of the surrogate server to other user terminals when the timer value is less than the batching window value.

8. The method of claim 4, wherein the transmitting of the content response message to the user terminal, includes:
deleting the session information when the timer value is equal to or more than the batching window value;
generating session information based on the content included in the received content request message;
storing the generated session information; and
generating the content response message in response to the content request message and transmitting the message to the user terminal.

9. The method of claim 8, wherein in the storing of the generated session information, the batching window value and the address of the surrogate server are stored and the timer value is initialized and stored.

10. The method of claim 9, wherein in the generating of the content response message in response to the content request message and transmitting of the message to the user terminal, the content response message including the address of the surrogate server is transmitted to the user terminal.

11. A batching-based content routing device comprising:
a communication unit configured to communicate with a user terminal;
a storage unit; and
a processing unit configured to, when content session information corresponding to a content request message received from a first user terminal through the communication unit is stored in the storage unit, compare a batching window value and a timer value included in the session information, generate a content response message including an address of a surrogate server that can receive content based on a comparison result and transmit the message to the first user terminal.

12. The device of claim 11, wherein, when the timer value included in the session information is less than the batching window value, the processing unit generates the content response message including the address of the surrogate server and transmits the generated content response message to the first user terminal through the communication unit.

13. The device of claim 11, wherein, when the timer value included in the session information is equal to or more than the batching window value, the processing unit deletes the session information stored in the storage unit, generates session information associated with the content requested from the first user terminal, stores the generated session information in the storage unit, and then generates the content response message including the address of the surrogate server and transmits the message to the first user terminal.

14. The device of claim 11, wherein the session information includes at least one of a batching window value that is a time for batch processing content request, content name, the address of the surrogate server that delivers requested content, and a timer value that is used for comparison with the batching window value.

15. The device of claim 11, wherein, when the content request message for requesting the same content as the first user terminal is received from a second user terminal through the communication unit and the timer value in the session information is less than the batching window value, the processing unit generates the content response message including the address of the surrogate server that has been transmitted to the first user terminal, and transmits the generated content response message to the second user terminal.

16. The device of claim 11, wherein the address of the surrogate server is an address of the surrogate server that is most appropriate for the first user terminal based on at least one of network proximity, server states, network states, and operator policies, when selecting surrogate servers storing the content.

* * * * *